June 13, 1967

REIJIRO ITO 3,325,759

DEVICE FOR IMPARTING HORIZONTALLY OSCILLATORY ROTATING MOVEMENT TO ARTICLES

Filed Aug. 30, 1965

INVENTOR
Reijiro Ito

BY Stevens, Davis, Miller & Mosher

ATTORNEYS

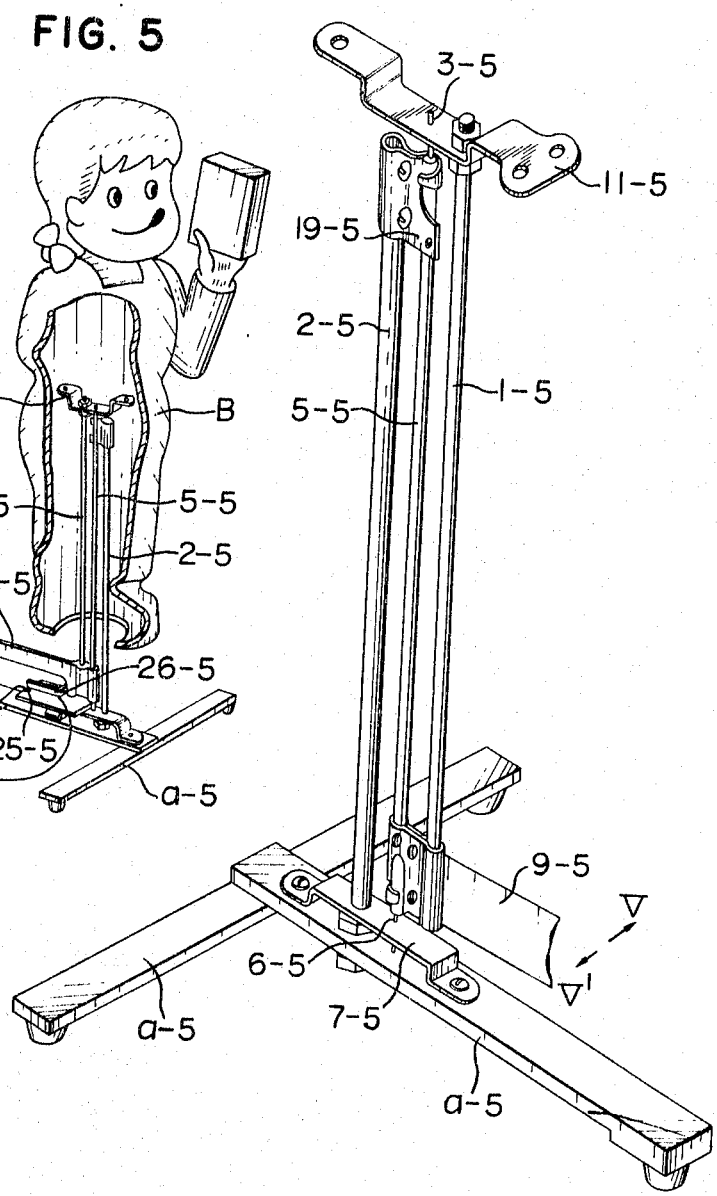

INVENTOR
Reijiro Ito
BY Stevens, Davis, Miller & Mosher
ATTORNEYS

United States Patent Office 3,325,759
Patented June 13, 1967

3,325,759
DEVICE FOR IMPARTING HORIZONTALLY OSCILLATORY ROTATING MOVEMENT TO ARTICLES
Reijiro Ito, Tokyo, Japan, assignor to Matsushita Electric Industrial Co., Ltd., Osaka, Japan, and Kokusai Display Kogyo Kabushiki Kaisha, Tokyo, Japan
Filed Aug. 30, 1965, Ser. No. 483,404
Claims priority, application Japan, Sept. 4, 1964, 39/70,100; Nov. 24, 1964, 39/90,996; June 16, 1965, 40/48,551; June 30, 1965, 40/39,871
3 Claims. (Cl. 335—229)

This invention relates to improvements in a device for impatring horizontally oscillatory rotating movement to articles.

Conventional devices for imparting movement to articles of advertisement such as articles of commerce, outdoor signboards and chandeliers have been provided with power supply means consisting of an electric motor and a reduction gearing of complex structure and have therefore encountered various operating difficulties including a problem of providing successful wear resisting means in a turntable and reduction gears and a problem of overheat in the motor due to continuous operation for an elongated period of time. In order to deal with these difficulties, conventional devices of the kind described have necessarily become complex in their structure, required a high cost of manufacture and required troublesome procedures for the proper maintenance thereof.

Difficulties have been encountered especially with a device for imparting movement to outdoor signs in which case breakage of its reduction gearing or overheat of its electric motor has frequently taken place due to overload by wind and thus the device has become uneconomical and has been difficult to put into practical application.

It has been acknowledged that an interesting manner of advertisement can be derived by providing a device which imparts horizontally oscillatory rotating movement opposite to each other to two articles of advertisement, articles of commerce, decorative articles or the like. However, due to the fact that such device inevitably requires a complex mechanism including link means, gear means or belt transmission means, requires a high cost of manufacture and is liable to break, this kind of device could not be mass-produced.

The present invention intends to eliminate the prior drawbacks as described above and has for one of its objects to provide a device for imparting horizontally oscillatory rotating movement to articles in which a movable support carrying thereon the articles such as articles of advertisement, articles of commerce or chandeliers is adapted to be moved by the combination of a force of repulsion or attraction between magnets and torsional movement of a resilient body carrying the movable support suspended therefrom so that the movable support is subjected to an interesting movement instead of mere constant-speed rotary movement and thus a great effect of display of the articles of advertisement can be obtained.

Another object of the present invention is to provide a device for impairing horizontally oscillatory rotating movement to articles in which a resilient suspension system is provided to support the movable support carrying thereon the articles such as articles of advertisement whereby load on the bearings for the movable support is reduced and the device of simple structure and of long service life can positively be utilized for use with outdoor signboards and the like.

A further object of the present invention is to provide a device for imparting horizontally oscillatory rotating movement to articles in which the movable support acting as an inner oscillator is freely rotatably mounted in an outer oscillator and at the same time carried in suspended relation in the outer oscillator by means of a resilient body while the outer oscillator is suspended from a stationary supporting member by means of a ineffective torque transmitting means such as a string or a chain so that the inner and outer oscillators make horizontally oscillatory rotating movement in directions opposite to each other and thus a device imparting a more interesting movement to the articles can be utilized for the purpose of advertisement or room accessories.

According to the present invention, the force for causing the rotary movement of the movable support or the inner and outer oscillators is generated by a combination of a force of repulsion or attraction between a permanent magnet or a magnetic body and an instantaneously energized electromagnet and a force of restitution of a resilient body against torsion. Therefore, power consumption is extremely small and rotary oscillation can be continued for a long period of time even with a source of power supply in the form of a battery.

The above and other objects, advantages and features of the present invention will become apparent from the following description with reference to the accompanying drawings, in which:

FIG. 5 is a partly cut-away perspective view of a further embodiment of the invention;

FIG. 6 is an enlarged perspective view of parts of FIG. 5;

Figure 1:
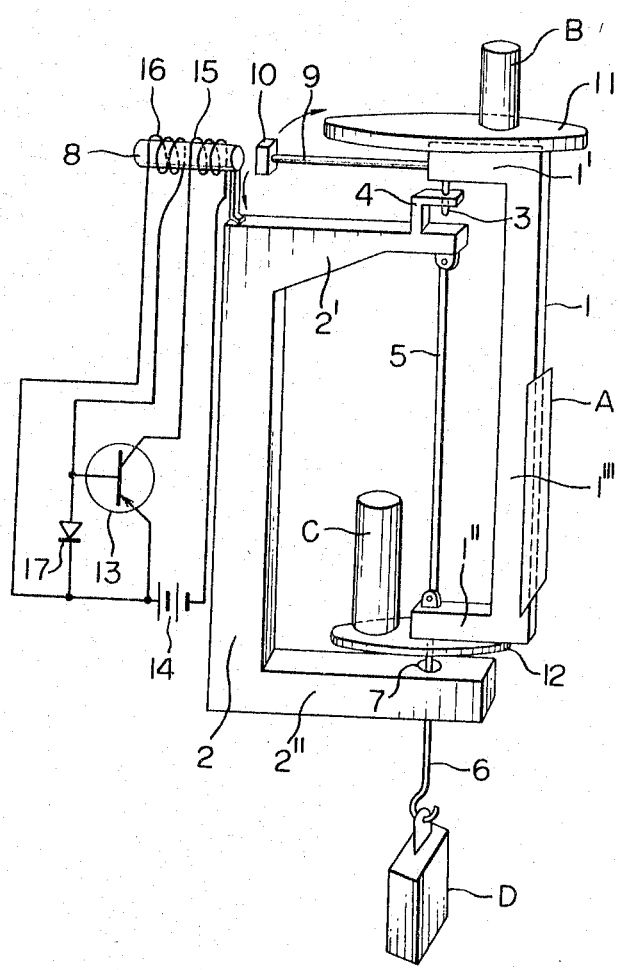
FIG. 1 is a perspective view of one embodiment of the device according to the present invention.

Referring first to FIG. 1 of the drawings, the device according to the present invention includes a generally U-shaped movable support 1 having articles to be moved mounted at any desired positions thereon. A stationary support 2 carries the movable support 1 thereon. A shaft 3 projects downwardly from a lower tip portion of an upper arm 1′ of the movable support 1 and is rotatably journalled in a bearing 4 provided at an upper tip portion of an upper arm 2′ of the stationary support 2. A resilient means or spring bar 5 is tensioned in coaxial relation with the shaft 3 between a lower tip portion of the upper arm 2′ of the stationary support 2 and an upper tip portion of a lower arm 1″ of the movable support 1. A suspension rod 6 depends in coaxial relation with the spring bar 5 from a lower tip portion of the lower arm 1″ of the movable support 1 and extends downwardly through a hole 7 bored through the tip portion of the lower arm 2″ of the stationary support 2 in loose fit relation with respect to the hole 7. An electromagnet 8 is fixed at the upper end of the stationary support 2. A rotary arm 9 is secured at one end to the tip portion of the upper arm 1′ of the movable support 1 and a permanent magnet 10 mounted on the free end of the arm 9 is opposed by the electromagnet 8 when the spring bar 5 is in its non-twisted state. As shown in FIG. 1, a signboard A is secured to the back wall of an upstanding web 1‴ of the movable support 1, and articles of commerce B and C are placed on display plates 11 and 12 fixed to the upper face of the arm 1' and to the lower face of the arm 1" of the movable support 1, respectively, while an article of commerce D is suspended from the lower end of the suspension rod 6.

A power supply 14 in the form of a battery and a coil 15 wound about the electromagnet 8 are connected between the emitter and collector of a transistor 13, while a coil 16 wound about the electromagnet 8 and a varistor 17 are connected to the base of the transistor 13.

The device shown in FIG. 1 operates in the following manner. The movable support 1 is adapted to freely rotate in the horizontal direction about the shaft 3 in unitary relation with the rotary arm 9 since the support 1 is rotatably pivoted to the stationary support 2 by the shaft 3 journalled in the bearing 4. However, rotation of the arm 9 causes torsion of the spring bar 5 as the arm 2' of the support 2 and the arm 1" of the support 1 are connected with each other by the spring bar 5. This torsion restricts the rotary movement of the arm 9, which is therefore forced back to its original position at which the spring bar 5 is free from its twisted state. At this original position of the arm 9, the permanent magnet 10 is directly opposed by the electromagnet 8 and magnetic flux variation generated in the iron core of the magnet 8 induces a voltage in the coil 16.

This induced voltage causes conduction of current between the emitter and collector of the transistor 13 and thus the current from the battery 14 is supplied to the coil 15 to thereby energize the electromagnet 8. Since the electromagnet 8 is selected to function to cause a force of repulsion between it and the permanent magnet 10, the arm 9 is urged away from its original position each time the permanent magnet 10 is opposed by the electromagnet 8 during the returning movement of the arm 9 and thus the horizontally oscillatory rotating movement of the arm 9 is continued without any attenuation.

The inventive device with the peculiar feature, in which the movable support 1 is swung by the oscillating movement of the arm 9 in cooperation with the torsion of the spring bar 5 being a bar of resilient material, exhibits a doubled advertising effect compared with conventional devices of constant-speed rotation so that the effect of display of the signboard A and the articles of commerce B, C and D can greatly be increased.

The resilient suspension system between the stationary support 2 and the movable support 1 by means of the spring bar 5 is advantageous in that load on the bearing 4 is reduced and the bearing 4 is almost free from frictional torque or wear so that the mechanism can work at high efficiency for a long service life.

The inventive device offers another advantage in that, even when the signboard A secured to the support 1 or the articles of commerce B and C placed on the display plates 11 and 12 become out of balance or when non-uniform load is applied to the shaft 3 due to wind or any other reason, there is utterly no fear of any inclination of the rotary arm 9 from its horizontal position and the movable support 1 is always kept at its upstanding position because the suspension rod 6 disposed in coaxial relation with the shaft 3 and the spring bar 5 is loosely received in the hole 7 of the arm 2" of the stationary support 2.

Figure 2:
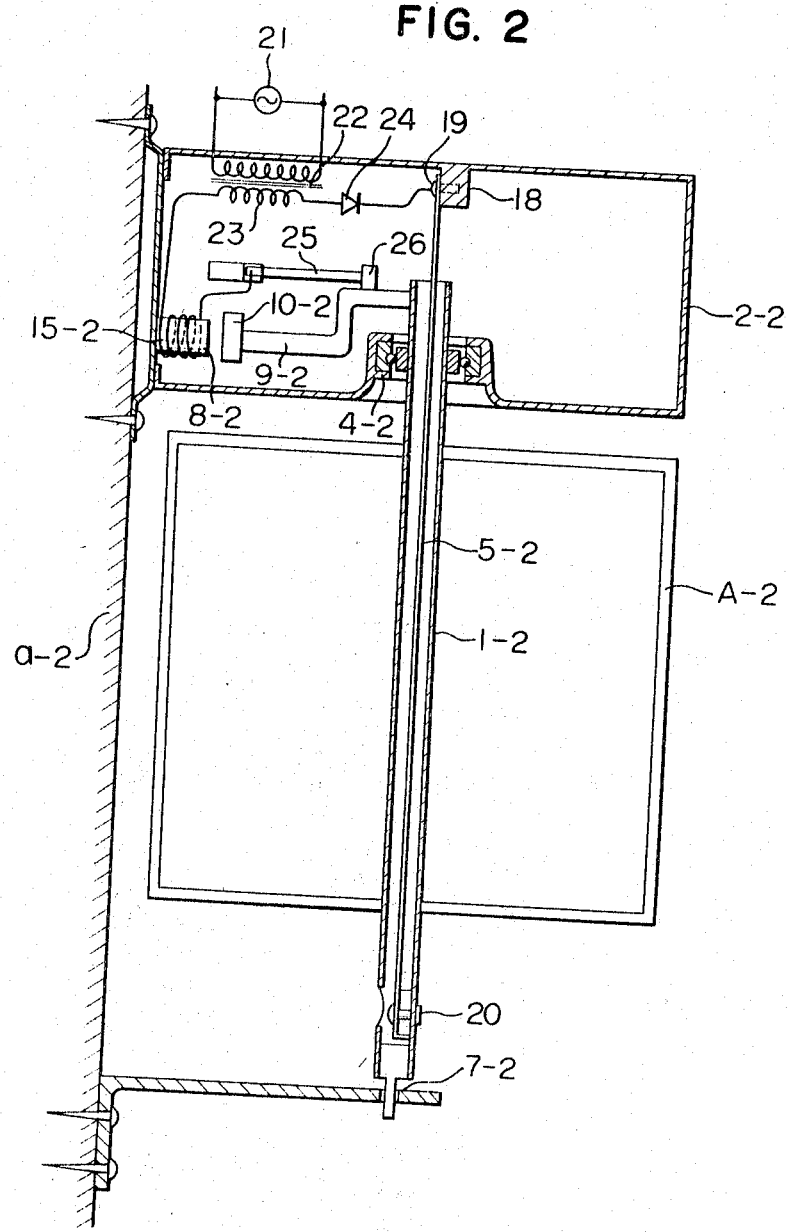
FIGS. 2, 3 and 4 are fragmentarily sectional side elevational views of other embodiments according to the present invention.

Another embodiment of the present invention shown in FIG. 2 has a structure which is adapted to impart movement to an outdoor signboard. The device of FIG. 2 includes a movable support 1-2 in the form of a tubular member. A stationary support 2-2 is firmly fixed to a wall a-2, and the movable support or tubular support 1-2 is journalled at opposite ends in a ball bearing 4-2 provided centrally of the support 2-2 and a bearing 7-2 disposed at a suitable lower position. A spring bar 5-2 is disposed within the tubular support 1-2 and has its upper end fixed by a rivet 19 to a projection 18 provided at an upper inner wall portion of the stationary support 2-2 while its lower end is fixed by a rivet 20 to a lower inner wall portion of the tubular support 1-2. A horizontally rotary arm 9-2 is fixed at one end to the upper end of the tubular support 1-2 and has a permanent magnet 10-2 fitted to the free end thereof. An electromagnet 8-2 is provided on the stationary support 2-2 in a manner that it can be opposed by the permanent magnet 10-2 at the non-twisted state of the spring bar 5-2.

A source of commercial A.C. supply 21 is connected to the primary winding of a voltage dropping transformer 22. One end of the secondray winding 23 of the transformer 22 is connected through a rectifier 24 to the rivet 19 and the other end thereof is connected to one end of an exciting coil 15-2 for the electromagnet 8-2. The other end of the coil 15-2 is connected to the rear end of a stationary contact 25 whose front end is disposed opposite a movable contact 26 fixed on the rotary arm 9-2. A signboard A-2 is mounted on the tubular support 1-2 as shown.

The device of FIG. 2 operates in the following manner. The tubular or movable support 1-2 is rotatably journalled in the bearings 4-2 and 7-2 and thus rotates in unitary relation with the rotary arm 9-2. This tubular support 1-2 is restored to its original position whenever a force of restitution against torsion imparted to the spring bar 5-2 by the rotation of the arm 9-2 urges the spring bar 5-2 to its non-twisted state. At the original position of the arm 9-2, the movable contact 26 is brought into contact with the stationary contact 25 so that the current reduced in its voltage by the transformer 22 and rectified by the rectifier 24 flows through the spring bar 5-2, tubular support 1-2, arm 9-2, contact 26 and contact 25 to the exciting coil 15-2 for the electromagnet 8-2, which is thereby energized to urge the permanent magnet 10-2 away therefrom. In this manner, the tubular support 1-2 continues its horizontally oscillatory rotating movement as in the case of FIG. 1.

Figure 3:
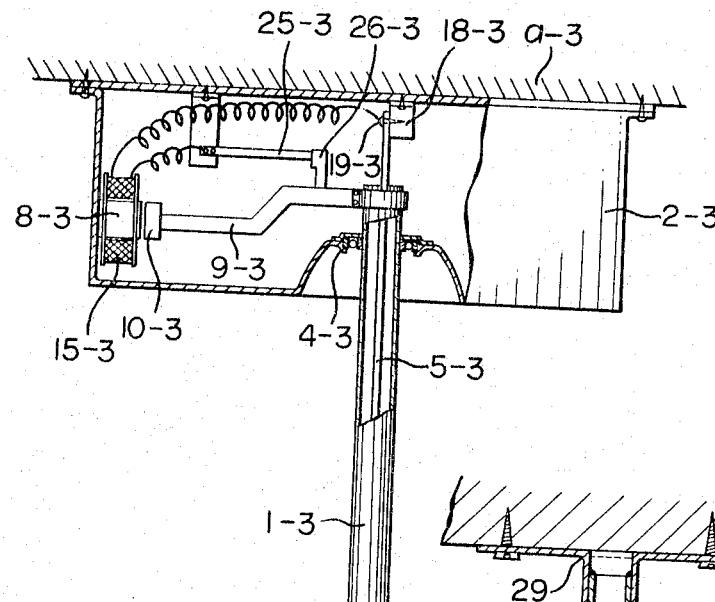

An embodiment shown in FIG. 3 is substantially similar to that shown in FIG. 2, but differs from the latter in that no bearing is provided to support the lower end of a tubular support 1-3. In the present embodiment, a casing 27 for accommodating a battery 14-3 is fitted to the lower end of the tubular support 1-3 and connection is made such that one end of an exciting coil 15-3 for an electromagnet 8-3 is connected to the negative terminal of the battery 14-3 through stationary contact 25-3, movable contact 26-3, rotary arm 9-3 and tubular support 1-3, while the other end of the coil 15-3 is connected to the positive terminal of the battery 14-3 through spring bar 5-3.

A stationary support 2-3 is fixed to a suitable portion of a ceiling wall a-3 and is provided centrally of its lower face with a bearing 4-3 to support the upper end of the tubular support 1-3. The upper end of the spring bar 5-3 disposed within the tubular support 1-3 is fixed to a projection 18-3 by a rivet 19-3. The lower end of the bar 5-3 is fixed by a rivet 20-3 to an electrical insulator 28 secured to the casing 27 and is connected to the positive terminal of the battery 14-3 by means of a lead 29. In this embodiment, any lateral movement of the tubular support 1-3 with respect to its vertical center line can effectively be prevented since the weight of the battery 14-3 and the casing 27 exerts a downward force directed in the axial direction of the tubular support 1-3.

Figure 4:
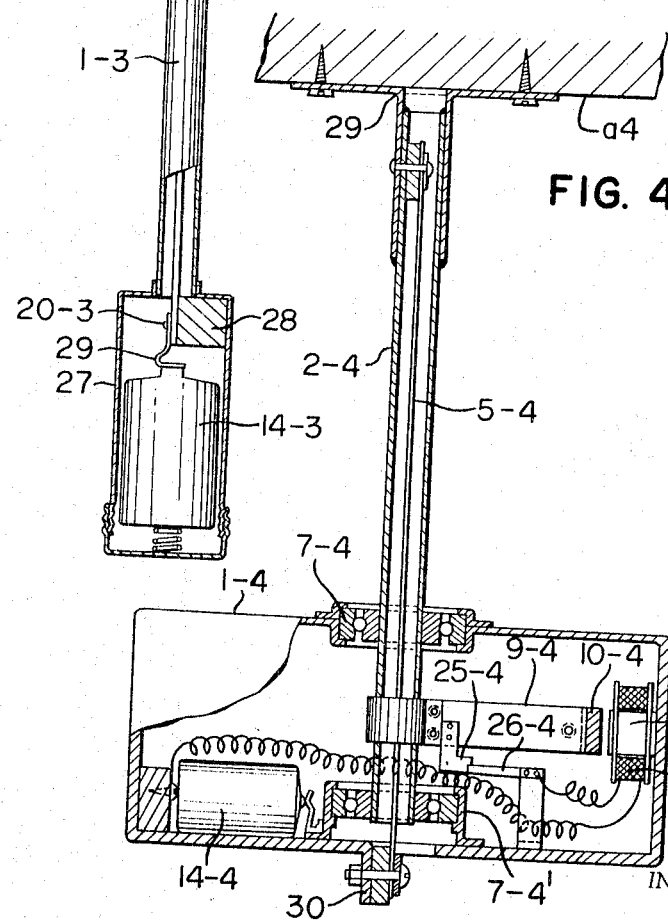

In another embodiment of the present invention shown in FIG. 4, a stationary support 2-4 in the form of a tubular member is fixed at its upper end to a suitable portion of a ceiling wall a-4 by a fixing member 29. A spring bar 5-4 is inserted in the tubular support 2-4 and is also fixed at its upper end to the fixing member 29. A box-shaped movable support 1-4 is provided centrally of its upper and lower walls and respective ball bearings 7-4 and 7-4' to be rotatably mounted on the lower end of the tubular support 2-4. A portion 30 centrally of the lower wall of the movable support 1–4 is cut open to be flared downwardly, and the lower end of the spring bar 5–4 is fixed to this flared portion 30. Thus, the movable support 1–4 is freely rotatably carried by the tubular support 2–4 in a manner to be suspended therefrom. A battery 14–4 is fixed in the left-hand side compartment of the movable support 1–4, and an electromagnet 8–4 and a movable contact 26–4 are fixed in the right-hand side compartment of the support 1–4.

A stationary arm 9–4 is secured at one end to the tubular support 2–4 and carries a permanent magnet 10–4 on its free end and a stationary contact 25–4 near its fixed end. It is so arranged that, when the spring bar 5–4 takes its non-twisted position, the movable contact 26–4 is brought into contact with the stationary contact 25–4 and at the same time the electromagnet 8–4 comes to a position at which it is opposed by the permanent magnet 10–4.

Therefore, successively greater torsion is imparted to the spring bar 5–4 as the movable support 1–4 rotates and this torsion applies a brake action to the rotating movement of the support 1–4 with the result that the movable support 1–4 is urged back to its original position at which the spring bar 5–4 retakes its non-twisted state. At this position of the movable support 1–4, the movable contact 26–4 is urged into contact with the stationary contact 25–4 to complete a closed circuit consisting of negative terminal of battery 14–4, exciting coil 15–4, movable contact 26–4, stationary contact 25–4, stationary arm 9–4, tubular support 2–4, movable support 1–4 and positive terminal of battery 14–4, so that the electromagnet 8–4 is energized to a polarity opposite to that of the permanent magnet 10–4 and is urged away from the latter. In this manner, the movable support 1–4 continues its oscillatory rotating movement.

Referring to FIGS. 5 and 6 showing still another embodiment according to the invention, an upright 2–5 to serve as a stationary support is supported on bases a–5. A bar 5–5 of resilient material is firmly fixed at its upper portion to the upper end of the upright 2–5 by a fixing member 19–5. Pins 3–5 and 6–5 extend upwardly and downwardly from the upper and lower ends of the bar 5–5, respectively, with the pin 6–5 being rotatably received in a bearing plate 7–5 mounted on one of the bases a–5. A horizontally oscillatory arm 9–5 has one end thereof fixed to a lower portion of the resilient bar 5—5 and carries a permanent magnet 10–5 on its free end. An oscillatory rod 1–5 to serve as a movable support is fixed at its lower end to a portion near the fixed end of the oscillatory arm 9–5 and has its upper end firmly fixed to a mounting member 11–5 for an article of advertisement B. A bearing is provided centrally of the mounting member 11–5 to rotatably receive the pin 3–5 of the resilient bar 5–5.

A stationary contact 25–5 and a movable contact 26–5 are provided on the base a–5 and the oscillatory arm 9–5, respectively, so that the latter contact is brought into contact with the former contact when the resilient bar 5–5 takes its non-twisted position and exciting current from a battery 14–5 flows to an exciting coil 15–5 for an electromagnet 8–5 fixed on the base a–5. Since now the permanent magnet 10–5 is opposed by the electromagnet 8–5, the force of repulsion between the magnets 10–5 and 8–5 generates a drive force to cause the oscillating movement of the arm 9–5. Therefore, the oscillatory rod 1–5 makes oscillatory rotating movement about the resilient bar 5–5 by being guided by the pins 3–5 and 6–5 to cause oscillating movement of the article of advertisement B mounted on the mounting member 11–5.

Figure 7:
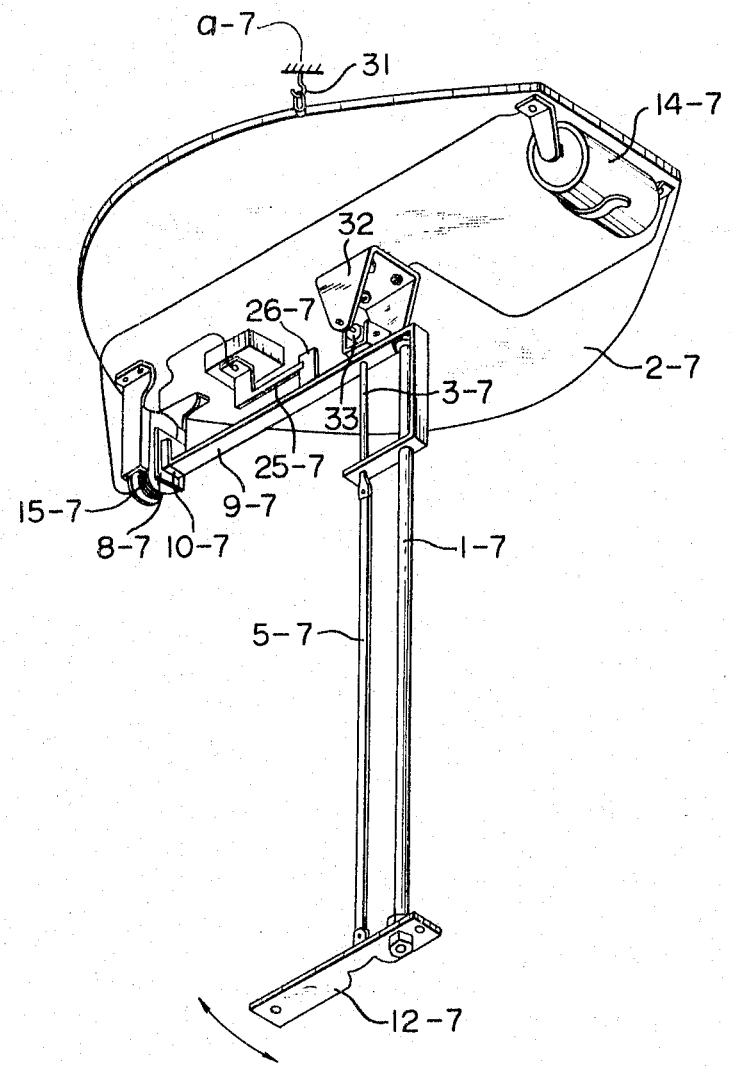
FIG. 7 is a perspective view of still another embodiment of the invention.
Figure 8:
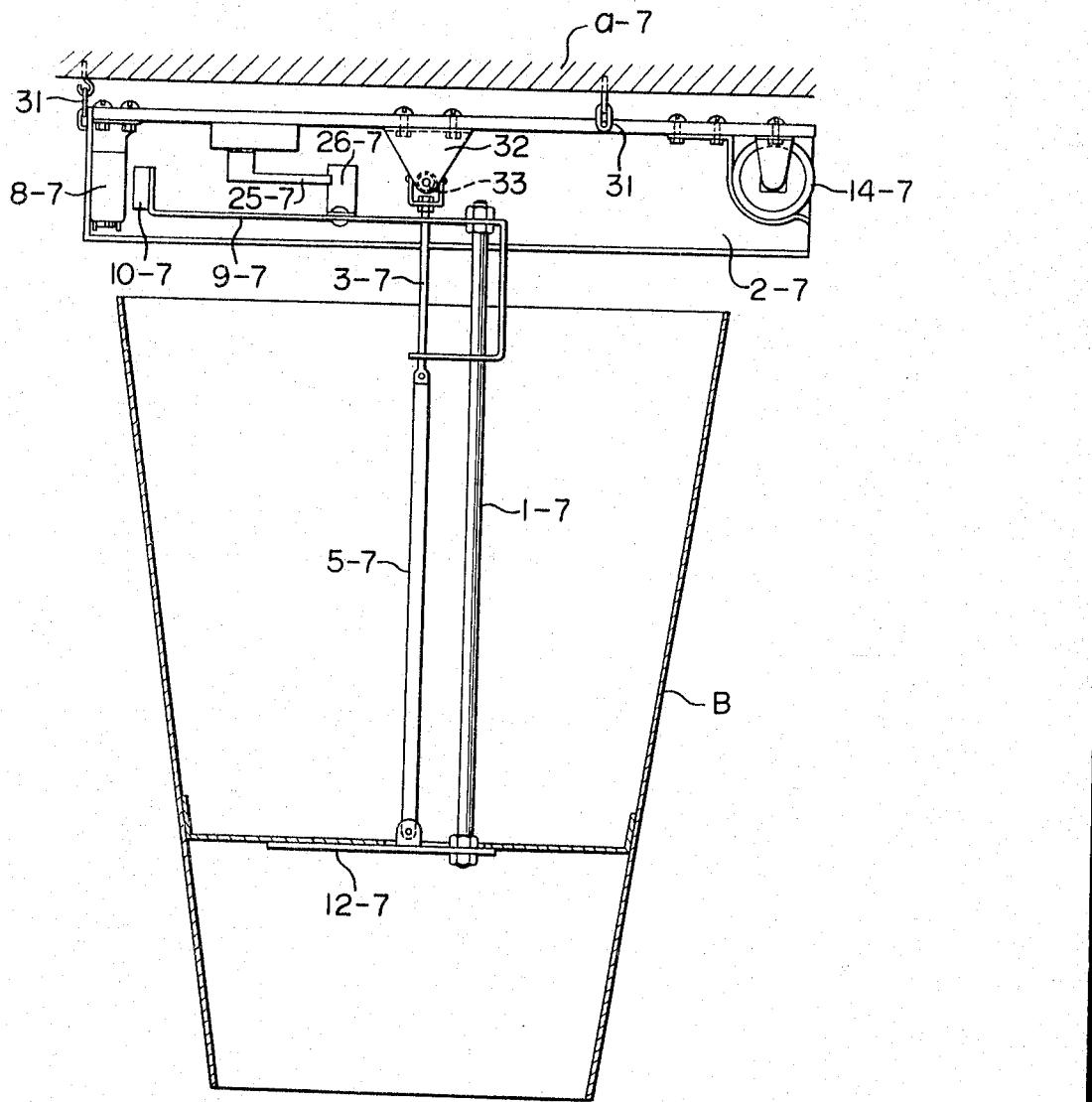
FIG. 8 is a side elevational view of the device of FIG. 7, the view showing a decorative signboard mounted in place.

In FIGS. 7 and 8 showing still another embodiment of the invention, a base plate 2–7 to serve as a stationary support is suspended from hangers 31 fixed to suitable portions of a ceiling wall a–7. A bracket 32 is fixed at a substantially central portion of the base plate 2–7 to suspend a suspension rod 3–7 therefrom through a universal joint 33. A bar 5–7 of resilient material is fixed at its upper end to the lower end of the suspension rod 3–7 to depend downwardly therefrom and has its lower end fixed to a rotary plate 12–7 on which an article of advertisement B is to be mounted.

An oscillatory rod 1–7 is fixed at its lower end to a portion near one end of the rotary plate 12–7 and has its upper portion fixed to one end of an oscillatory arm 9–7, which is loosely mounted for rotation on the suspension rod 3–7 and carries a permanent magnet 10–7 on its free end. A stationary contact 25–7 and a movable contact 26–7 are provided on the base plate 2–7 and the oscillatory arm 9–7, respectively, in a manner that the latter contact is brought into contact with the former contact when the resilient bar 5–7 takes its non-twisted position. An electromagnet 8–7 is fixed on the base plate 2–7 so that, at the above position of the resilient bar 5–7, the electromagnet 8–7 connected to a dry battery 14–7 is opposed by the permanent magnet 10–7 on the arm 9–7 and is energized to a polarity opposite to that of the permanent magnet 10–7.

When now the permanent magnet 10–7 and the electromagnet 8–7 are opposite to each other and the contact 26–7 is in contact with the contact 25–7, exciting current supplied from the battery 14–7 to the exciting coil 15–7 energizes the electromagnet 8–7 to urge the permanent magnet 10–7 away therefrom. Therefore, the oscillatory arm 9–7 rotates about the suspension rod 3–7 and the contact 26–7 is urged away from the contact 25–7. This movement of the oscillatory arm 9–7 causes torsion of that portion of the resilient bar 5–7 on the side of the rotary plate 12–7 with the portion thereof adjacent the suspension rod 3–7 left fixed, with the result that the oscillatory arm 9–7 is restricted from further movement and is urged backwardly to its original position. The electromagnet 8–7 is energized to urge the permanent magnet 10–7 away therefrom each time the magnet 8–7 is opposed by the magnet 10–7 and the circuit is closed by the contacts 25–7 and 26–7. Thus, the oscillatory arm 9–7 continues its oscillating movement without any attenuation. It will be apparent that such oscillating movement of the arm 9–7 causes corresponding movement of the rotary plate 12–7 and of the article of advertisement B mounted on the plate 12–7.

Figure 9:
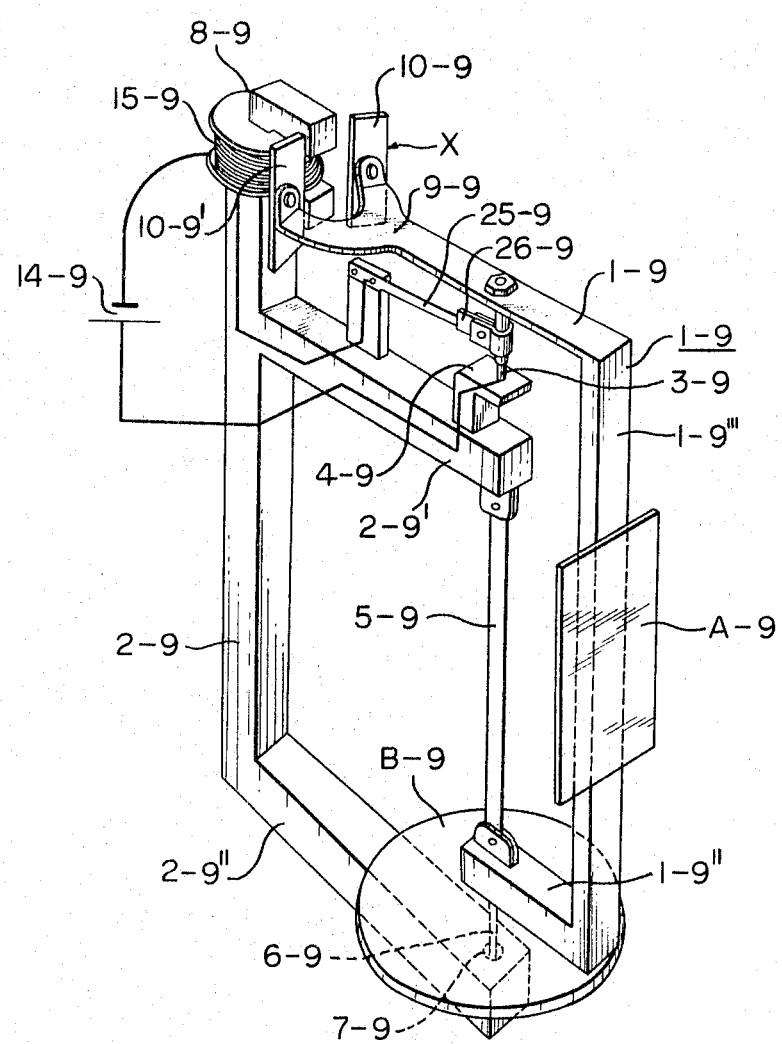
FIG. 9 is a perspective view of another embodiment of the invention.

In still another embodiment shown in FIG. 9, arrangement is made so that force of attraction between an electromagnet and a magnetic body is utilized to cause oscillatory rotation of a movable support. In this embodiment, one end of a rotary arm 9—9 is bifurcated to carry thereon a pair of magnetic bodies such as soft iron pieces 10–9 and 10–9′. The arrangement employed herein is such that, when a resilient bar 5–9 is in its non-twisted state, a movable contact 26–9 provided on the arm 9—9 is brought into contact with a stationary contact 25–9 provided on a stationary support 2–9 and an electromagnet 8–9 fixed on the support 2–9 is brought to a position intermediate between the iron pieces 10–9 and 10–9′.

Suppose now that the arm 9—9 is urged back in a direction of arrow X by a force of restitution taking place in the resilient bar 5–9 against torsion. When the arm 9—9 is brought to a position at which the electromagnet 8–9 opposes to an intermediate portion between the iron pieces 10–9 and 10–9′, that is, immediately before the iron piece 10–9 is opposed by the electromagnet 8–9, the electromagnet 8–9 is energized through contact between the contacts 26–9 and 25–9 so that the force of attraction exerted by the eelctromagnet 8–9 on the iron piece 10–9 causes rotary movement of the arm 9—9 in the direction of arrow X. When the iron piece 10–9 is brought to a position just opposite the electromagnet 8–9, the contacts 26–9 and 25–9 are moved away from each other. Therefore the electromagnet 8–9 now has no force of attraction and can not act to prevent the rotary movement of the arm 9—9 in the direction of arrow X. Then when torsion is imparted to the resilient bar 5–9 by the rotation of the arm 9—9 in the direction X and, as a result thereof, the arm 9—9 is urged back in a direction opposite to the direction X by the force of restitution against this torsion, the iron piece 10-9' is attracted to the electromagnet 8-9 immediately before it is brought to a position opposite to the magnet 8-9 so that drive force is continuously imparted to the arm 9—9. Therefore, the movable support 1-9 continues its oscillatory rotating movement as described with regard to the previous embodiments.

Referring to FIGS. 10 to 13, various other embodiments will be described which include an inner and an outer oscillator adapted to make horizontal oscillations in directions opposite to each other. The inner oscillator in these embodiments is similar to the movable support shown in the previous embodiments, and the outer oscillator is similar to the support carrying the movable support suspended therefrom by means of a resilient bar. In these emobdiments, however, the outer oscillator is rotatably suspended from a suitable weight supporting member by means of an ineffective torque transmitting member such as a string or a chain.

Figure 10:
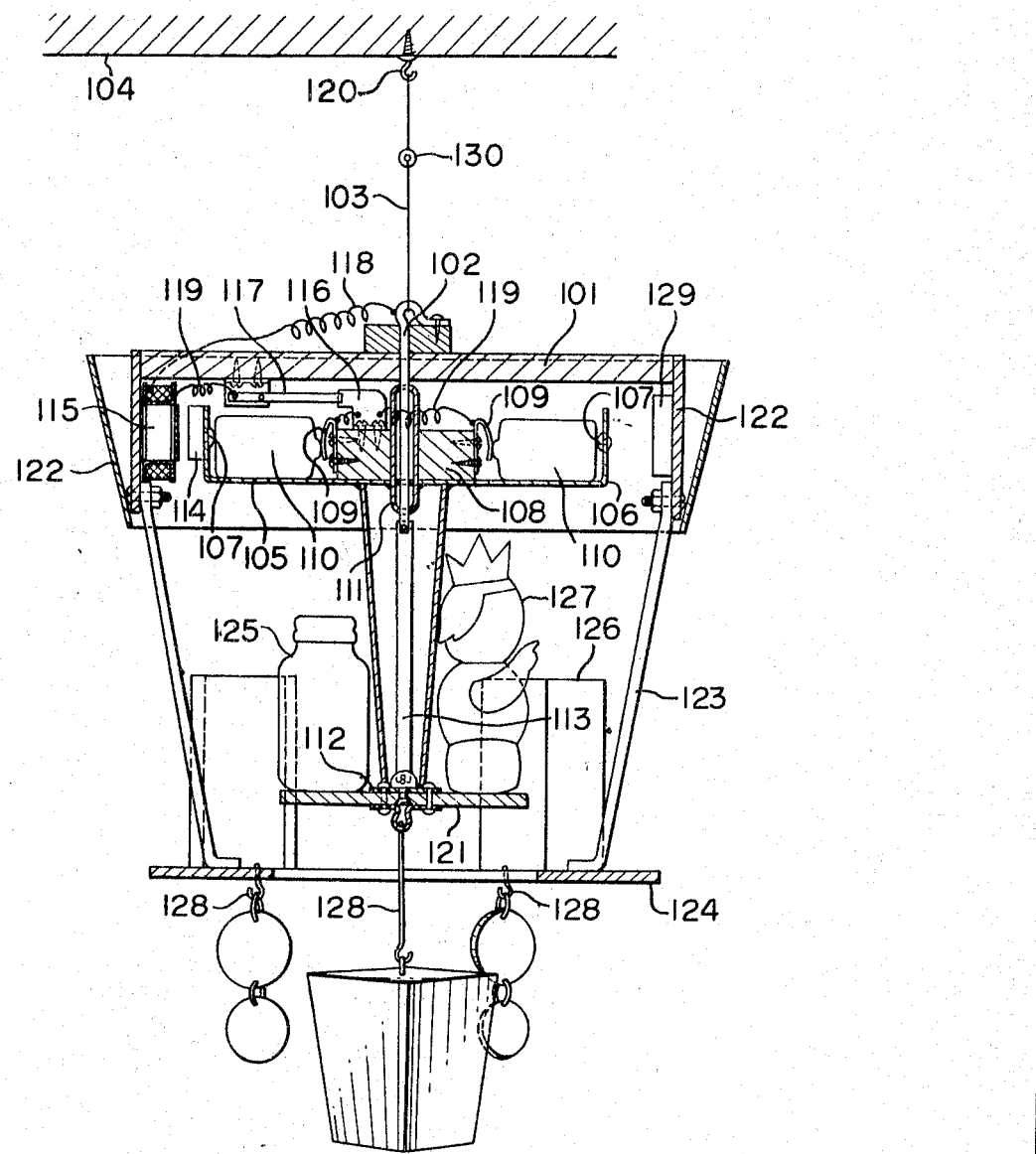
FIGS. 10 through 13 show other embodiments of the invention in which inner and outer oscillators are provided and arranged to make horizontally oscillatory rotating movements opposite to each other, FIGS. 10, 11 and 12 being partly cutaway side elevational views, and FIG. 13 being a top plan view of parts of FIG. 12.

Referring first to FIG. 10, the device includes an outer oscillator 101 in which a support rod 102 is fixed on a vertical line passing through the center of gravity of the oscillator 101. The support rod 102 is rotatably suspended from any suitable weight supporting member 104 such as a ceiling wall by means of an ineffective torque transmitting member 103 such as a string connected to the top end thereof.

An inner oscillator 105 includes a metal frame 106 and a wooden frame 108. Terminals 107 are fixed at opposite ends of the frame 106 as by caulking, while terminals 109 are fixed at opposite ends of the frame 108 to receive therebetween two batteries 110. A bearing 111 is provided in the inner oscillator 105 on a vertical line passing substantially through the center of gravity of the oscillator 105, and the support rod 102 of the outer oscillator 101 loosely fits in this bearing 111 so that the outer and inner oscillators 101 and 105 can make horizontal rotation relative to each other. A resilient bar mounting member 112 is fixed to the lower end of the inner oscillator 105, and a resilient bar 113 which has its upper end secured to the lower end of the support rod 102 is fixed at its lower end to this mounting member 112 so as to support the inner oscillator 105 in the outer oscillator 101 by the resilient bar 113.

A permanent magnet 114 is provided on a suitable outer peripheral portion of the inner oscillator 105, and an electromagnet 115 is disposed on the outer oscillator 101 in opposed relation with respect to the magnet 114. Contacts 116 and 117 are provided on the inner and outer oscillators 105 and 101, respectively. The disposition of these magnets and contacts is such that, when the resilient bar 113 comes to its non-twisted state during movement of the inner oscillator 105 relative to the outer oscillator 101, the contacts 116 and 117 are brought into contact and the permanent magnet 114 is opposed by the electromagnet 115.

The negative terminal of the battery 110 is connected to one end of an exciting coil for the electromagnet 115 through the metal frame 106 of the inner oscillator 105, resilient bar mounting member 112, resilient bar 113, support rod 102 and lead 118, while the terminal 109 resiliently contacting the positive terminal of the battery 110 is connected to the other end of the exciting coil for the electromagnet 115 through a lead 119 and contacts 116 and 117.

When now the resilient bar 113 is in its non-twisted state so that the permanent magnet 114 is opposed by the electromagnet 115 and current from the batteries 110 conducts through the contacts 116 and 117 to the electromagnet 115 to create relative force of repulsion between the magnets 114 and 115, the inner oscillator 105 solely will make its horizontal rotation provided that the outer oscillator 101 is fixed as in the cases of the embodiments shown in FIGS. 1 to 9. Since however the outer oscillator 101 is also suspended by the suspending member 103 such as a slender string of nylon which difficultly transmits torsional torque, the outer and inner oscillators 101 and 105 make horizontal rotation about the support rod 102 in directions opposite to each other.

Due to the fact that the total weight of the inner oscillator 105 is supported by the resilient bar 113 which is connected through the support rod 102 with the suspending member 103 which in turn is suspended from a hanger 120 fixed to the ceiling wall 104, the inner oscillator has no bearing portion subjected to vertical load and its fractional resistance is very small. Therefore, the inner oscillator 105 tends to continue its horizontal rotation by being urged by the force of repulsion between the electromagnet 115 and the permanent magnet 114. However, the resilient bar 113 is twisted by an angle of rotation through which the oscillators have moved relative to each other, while the suspending member 103 is twisted by an angle of rotation through which the outer oscillator 101 has moved, with the result that forces of restitution against there torsions limit further horizontal rotation of the oscillators and urge them to their original positions. Thus the oscillators make their respective horizontal torsional rotations. By the reason that the force of restitution caused in the suspending member 103 is less than that caused in the resilient bar 113, the oscillators 101 and 105 rotate in directions opposite to each other. During their movement of restitution, the permanent magnet 114 and the electromagnet 115 come to oppose each other and the force of repulsion acting between these magnets imparts drive force to cause rotation of the oscillators. In this manner, the inner and outer oscillators make their horizontally oscillating movement in directions opposite to each other.

Such oscillating movement of the inner and outer oscillators could be a quite interesting movement for viewers. In order to utilize this interesting movement for advertisement, a table 121 of transparent material may be fixed to the lower end of the inner oscillator 105, or a table 124 of transparent material may be suspended by supports 123 of transparent material connected to and extending downwardly from opposite ends of a wooden frame 122 of the outer oscillator 101, and articles of commerce 125 and 126 or a doll 127 may be placed on the tables 121 and 124. Suitable signboards may be attached to the outer and inner oscillators 101 and 105 or an article of commerce may be suspended from the table 121 by a hanger 128 to enhance the advertising effect.

A block 129 may be provided for the purpose of balancing and improving the moment of inertia of the outer oscillator 101, and an untwisting means 130 may be provided to prevent the suspending member 103 from being twisted off when the outer oscillator 101 should make several turns for any reason, for example, by being hit by something.

Figure 11:
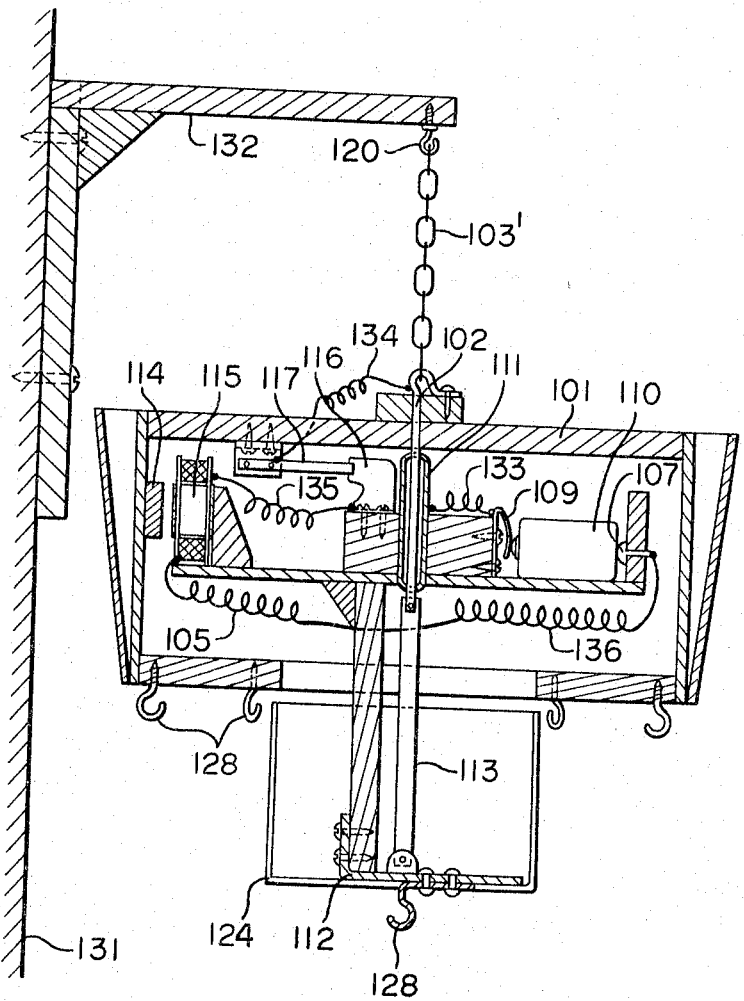

In another embodiment shown in FIG. 11, an outer oscillator 101 is suspended from a hanger 120 by a chain 103'. The hanger 120 is fixed at the tip of a bracket 132 secured to a wall 131. In order to counterbalance the weight of a single battery 110, an electromagnet 115 is provided on the periphery of an inner oscillator 105 at a position opposite the battery 110.

In this embodiment, the positive terminal of the battery 110 held on the inner oscillator 105 is connected with one end of an exciting coil for the electromagnet 115 through contact 109, lead 133, bearing 111, support rod 102, lead 134, contacts 117 and 116, and lead 135, while the negative terminal is connected with the other end of the exciting coil through contact 107 and lead 136.

Figure 12:
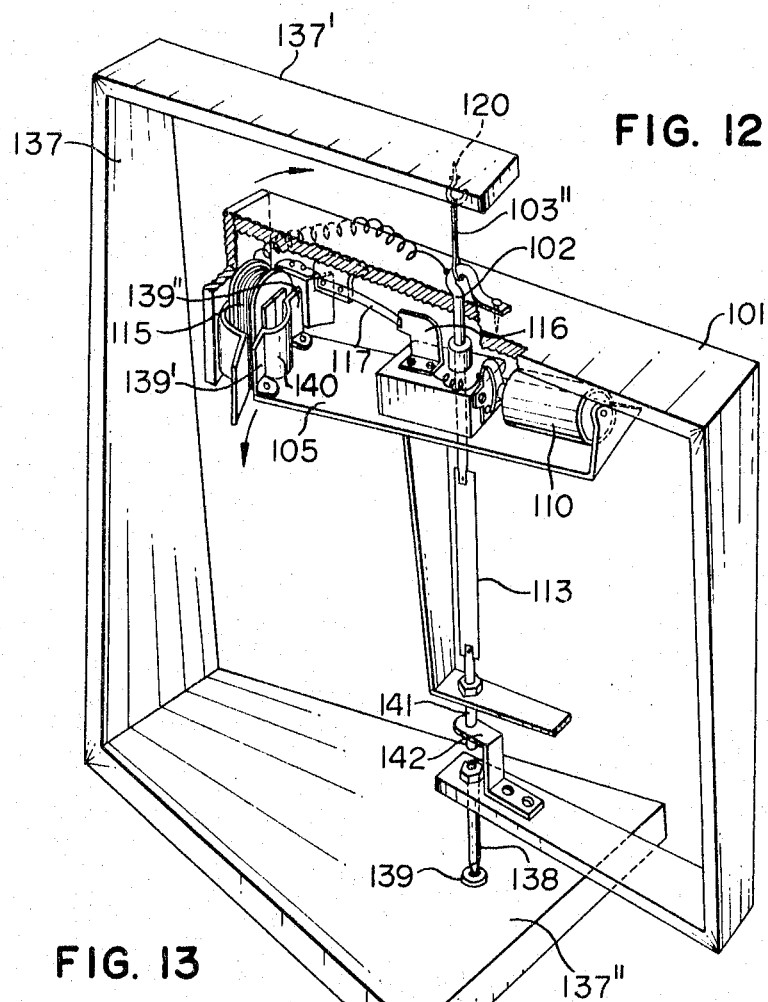
Figure 13:
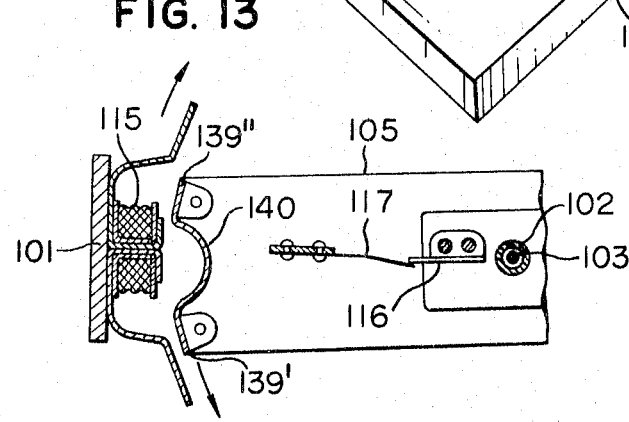

Still another embodiment of the invention shown in FIGS. 12 and 13 employs a U-shaped support for an outer oscillator in lieu of a bracket fixed to a ceiling or wall. In this embodiment, drive force for causing horizontal rotation of outer and inner oscillators in directions opposite to each other is derived from a force of attraction between an electromagnet and magnetic bodies, as in the case of the embodiment shown in FIG. 9.

Or more precisely, a support rod 102 for an outer oscillator 101 is suspended by a rubber string 103″ from a hanger 120 fixed to the tip of an upper arm 137′ of a U-shaped stationary support 137, and a shaft 138 extends downwardly from a lower arm of the outer oscillator 101 so as to be supported at the lower end in a pivot bearing 139 disposed on a lower arm 137″ of the support 137. A pair of magnetic bodies, for example, a soft iron plate 140 having a pair of opposite arms 139′ and 139″ is secured at an outer peripheral portion of an inner oscillator 105, and an electromagnet 115 is provided on the outer oscillator 101 at a position opposite to the soft iron plate 140. Arrangement is such that, when the electromagnet 115 is brought to a position opposite the central portion of the iron plate 140, contacts 116 and 117 are brought into contact with each other to energize the electromagnet 115 and the force of attraction acts between the electromagnet 115 and one of the arms, for example, the arm 139′ of the soft iron plate 140 immediately before they oppose to each other so that the oscillators are urged in directions opposite to each other.

A shaft 141 is fixed at its upper end to the lower end of a resilient bar 113 and at its middle portion to a lower arm of the inner oscillator 105 and extends downwardly to be freely rotatably received at its lower end in a bearing 142 provided on the lower arm of the outer oscillator 101.

It will easily be known that the contact-less switching system utilizing the transistor as shown in FIG. 1 can also be applied to the embodiments shown in FIGS. 10 to 13.

From the foregoing description, it will be understood that, in the device according to the present invention, drive force for causing rotation of a movable body supporting an article of advertisement, an article of commerce, a chandelier or the like is derived from a combined action of force of repulsion or attraction imparted by an electromagnet and torsional movement of a resilient body. Therefore, the movable body makes an interesting movement attracting attention of viewers instead of the conventional constant-speed rotary movement and the resilient suspension system for the article of advertisement, etc. employed in the invention reduces load on the bearing. Thus, the inventive device having a simplified mechanism and a long service life can successfully be used with outdoor signboards. Further, it will be appreciated that, by virtue of extremely little power consumption, power supply means such as a battery can conveniently be used for operation over an extended period of time.

What is claimed is:

1. A device for imparting horizontal oscillatory rotating movement to articles comprising: a first support and a second support each having at least an upper arm and a lower arm, the upper and lower arms of said first support being rotatably mounted with respect to portions of the upper and lower arms of said second support respectively, at least one of said supports carrying the article; resilient means mounted between the upper arm of said second support and the lower arm of said first support so that said resilient means is under strain bearing substantially the entire weight of said first support and is aligned with the mounting portions of said support; a magnetic material member mounted on one of said supports; and an electro-magnet mounted on the other support so as to be closely adjacent said magnetic material member when said resilient means is at rest, said electromagnet being selectively energized to effect relative horizontal oscillatory rotating movements to said magnetic material member.

2. A device for imparting horizontal oscillatory rotating movement to articles comprising: a movable support and a stationary support each having at least an upper arm and a lower arm, the upper and lower arms of said movable support being rotatably mounted with respect to portions of the upper and lower arms of said stationary support, at least one of said supports carrying the article; resilient means arranged under tension between said upper arm of said stationary support and said lower arm of said movable support so that said resilient means is aligned with the mounting portions of said support bearing substantially the entire weight of said movable support; a permanent magnet fixedly mounted on one of said supports; and an electro-magnet fixedly mounted on the other support and positioned to oppose said permanent magnet in the at rest state of said resilient means, said electro-magnet being selectively energized to exert a repulsive force on said permanent magnet.

3. A device for imparting horizontal oscillatory rotating movement to articles comprising: a movable support and a stationary support each having at least an upper arm and a lower arm, the upper and lower arms of said movable support being rotatably mounted with respect to portions of the upper and lower arms of said stationary support respectively, at least one of said supports carrying the article; resilient means arranged in tension between the upper arm of said stationary support and the lower arm of said movable support so that said resilient means is aligned with the mounting portions of said supports and bears substantially the entire weight of said movable support; a pair of magnetic material members on one of said supports, said pair of magnetic material members being spaced a predetermined distance from each other; and an electro-magnet mounted on the other support opposite the intermediate point between said pairs of magnetic material members when said resilient member is at rest, said electro-magnet being selectively energized to exert an attractive force on either of said pair of magnetic material members.

References Cited

UNITED STATES PATENTS

| | | | |
|---|---|---|---|
| 837,701 | 12/1906 | Mendelson. | |
| 2,445,401 | 7/1948 | Langer | 310—32 X |
| 2,626,364 | 1/1953 | Underwood | 310—32 |
| 2,629,966 | 3/1953 | Russ | 40—53 |
| 2,744,201 | 5/1956 | Glaser | 310—32 |
| 2,810,083 | 10/1957 | Dunay | 310—32 X |
| 3,075,102 | 1/1963 | Dunay | 310—32 X |

BERNARD A. GILHEANY, *Primary Examiner.*

J. J. BAKER, G. HARRIS, *Assistant Examiners.*